United States Patent [19]

Nagai

[11] Patent Number: 5,615,370
[45] Date of Patent: Mar. 25, 1997

[54] COMPUTER SYSTEM WITH AUTOMATIC DEGRADATION/INITIALIZATION FUNCTION

[75] Inventor: Yukio Nagai, Kawasaki, Japan

[73] Assignee: Fujitsu Limited, Kawasaki, Japan

[21] Appl. No.: 377,403

[22] Filed: Jan. 24, 1995

[30] Foreign Application Priority Data

Sep. 16, 1994 [JP] Japan ................................ 6-221245

[51] Int. Cl.$^6$ .............................. G06F 15/16; G06F 11/22
[52] U.S. Cl. ............... 395/672; 395/182.01; 395/182.21; 395/183.13; 395/651
[58] Field of Search .................... 395/700, 650, 395/800, 182.01, 182.21, 183.13, 200.03

[56] References Cited

U.S. PATENT DOCUMENTS

| | | | |
|---|---|---|---|
| 4,445,197 | 4/1984 | Lorie et al. | 395/650 |
| 5,179,715 | 1/1993 | Andoh et al. | 395/800 |
| 5,247,675 | 9/1993 | Farvell et al. | 395/650 |
| 5,392,430 | 2/1995 | Chen et al. | 395/650 |
| 5,452,461 | 9/1995 | Umekita et al. | 395/700 |
| 5,528,761 | 6/1996 | Ooba et al. | 395/200.14 |

OTHER PUBLICATIONS

Abstract of Japanese Publication 1-224861 dated Sep. 7, 1989.

*Primary Examiner*—Larry D. Donaghue
*Attorney, Agent, or Firm*—Staas & Halsey

[57] ABSTRACT

A computer system is provided which is equipped with a plurality of CPUs and has an automatic degradation/initialization function, wherein even if fault occurs in any of the CPUs, the system can be automatically initialized to perform a task that is executable by the remaining CPUs. When power is supplied to the computer system, a CPU monitor and control unit isolates a faulty CPU among the CPUs. A minimum number storing unit previously stores a minimum number of CPUs required for accomplishing a predetermined task. A comparing unit compares the number of normal CPUs with the minimum number of CPUs stored in the minimum number storing unit. When the number of normal CPUs is greater than or equal to the minimum number of CPUs, an initialization control unit judges that the system can be initialized, and thus initializes the computer system; when the number of normal CPUs is smaller than the minimum number of CPUs, the initialization control unit judges that the system cannot be initialized, and thus suspends the initialization of the computer system.

3 Claims, 4 Drawing Sheets

COMPUTER SYSTEM WITH AUTOMATIC DEGRADATION/INITIALIZATION FUNCTION

BACKGROUND OF THE INVENTION

1. Field of the Invention

The present invention relates to a computer system equipped with a plurality of CPUs (Central Processing Units) and having an automatic degradation/initialization function.

2. Description of the Related Art

Degradation denotes an operation in which a faulty component is isolated from a system and the system is reconfigured into a lower capacity state, and initialization process denotes a sequence of operations required from power supply to a computer until the computer becomes ready for executing a program. The initialization process includes power supply to individual devices, designation of operating mode and system configuration, initialization of the computer internal state (states of control flip-flops, registers, main storage, buffer storage, etc.), and loading of microprogram and various tables. In large-scale computers, the initialization process is performed under the control of an SVP (Service Processor).

In a conventional mainframe equipped with a plurality of CPUs, when power is supplied to the system, the SVP performs an initial diagnosis on the individual devices of the mainframe, such as the CPUs. If fault in a CPU is detected as a result of the diagnosis, the SVP informs such fault to a monitoring center, operation of the mainframe is suspended, and the initialization of an OS (Operating System) by IPL (Initial Program Loading), which should originally be executed thereafter if the system is normal, is prohibited.

However, some of various tasks (applications programs) executed by the mainframe do not require all CPUs to be operated and can be adequately accomplished with some remaining CPUs. Accordingly, there has been a demand for executing such tasks by isolating faulty CPUs and initializing the OS by the remaining CPUs.

The SVP has a function of isolating only faulty CPUs and initializing the remaining CPUs. Thus, the aforementioned demand may be met by using this function, but still remains unfulfilled because the number of CPUs required for executing each of the tasks is unknown.

SUMMARY OF THE INVENTION

An object of the present invention is to provide a computer system with an automatic degradation/initialization function wherein, even if fault occurs in any of a plurality of CPUs, the system is automatically initialized to accomplish a task that is executable by the remaining CPUs.

To achieve the above object, there is provided according to the present invention a computer system equipped with a plurality of CPUs and having an automatic degradation/initialization function. This computer system comprises CPU monitor and control means for monitoring the CPUs when power is supplied to the computer system, to determine whether fault has occurred in any of the CPUs, and for isolating a faulty CPU upon detection, minimum number storing means for previously storing a minimum number of CPUs required for accomplishing a predetermined task, comparing means for comparing a number of normal CPUs among the CPUs with the minimum number of CPUs stored in the minimum number storing means, and initialization control means, responsive to a result of the comparison by the comparing means, for initializing the computer system when the number of normal CPUs is greater than or equal to the minimum number of CPUs, and for suspending initialization of the computer system when the number of normal CPUs is smaller than the minimum number of CPUs.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment according to the present invention will be outlined first.

Figure 1:
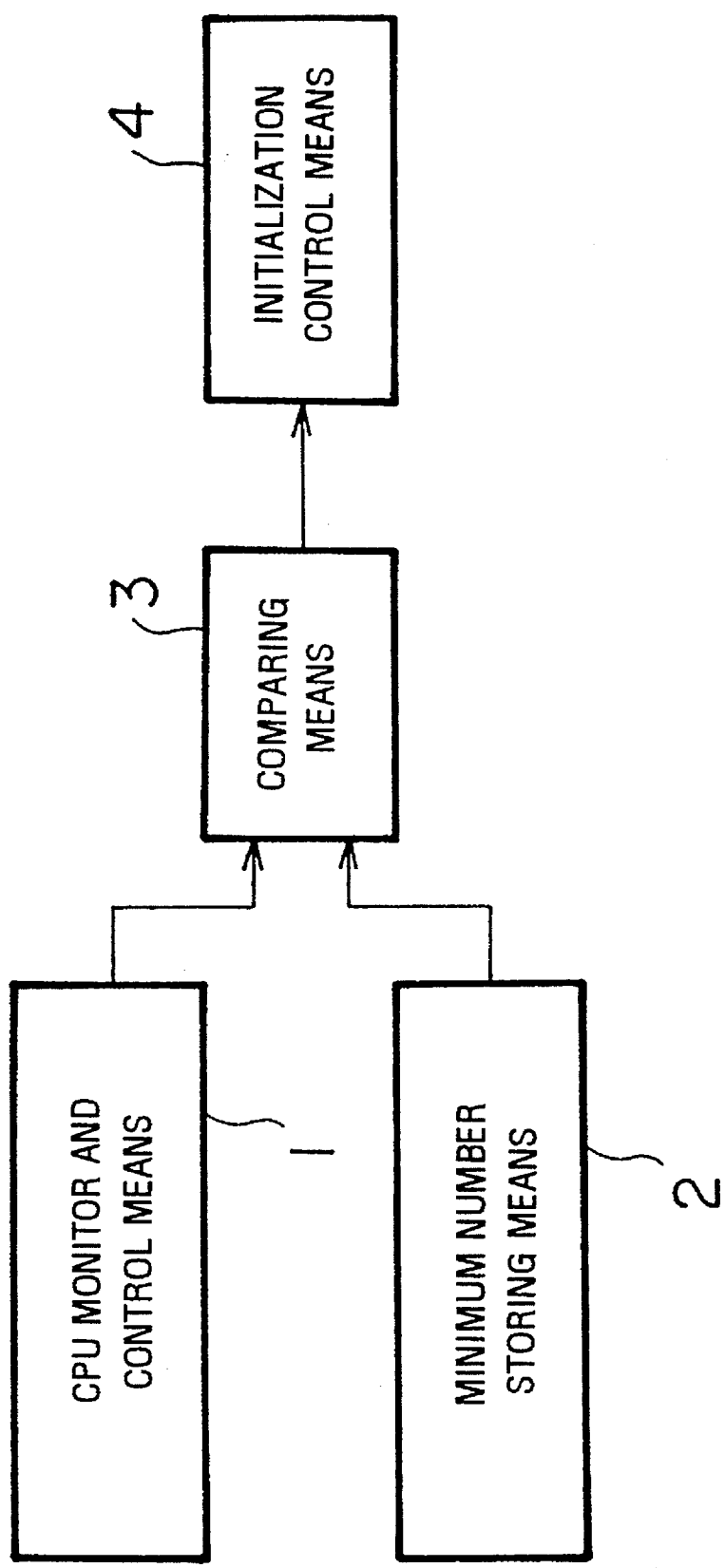
FIG. 1 is a diagram illustrating the principles of the present invention.

As shown in FIG. 1, a computer system comprises CPU monitor and control means 1 for monitoring a plurality of CPUs when power is supplied to the system, to determine whether fault has occurred in any of the CPUs, and for isolating a faulty CPU upon detection, minimum number storing means 2 for previously storing a minimum number of CPUs required for accomplishing a predetermined task, comparing means 3 for comparing a number of normal CPUs with the minimum number of CPUs stored in the minimum number storing means 2, and initialization control means 4, responsive to the result of the comparison by the comparing means 3, for initializing the system when the number of normal CPUs is greater than or equal to the minimum number of CPUs, and for suspending initialization of the system when the number of normal CPUs is smaller than the minimum number of CPUs.

In this arrangement, the CPU monitor and control means 1 monitors a plurality of CPUs when power is supplied to the system, to determine whether fault has occurred in any of the CPUs, and isolates a faulty CPU upon detection. The minimum number storing means 2, on the other hand, previously stores the minimum number of CPUs required for accomplishing a predetermined task.

The comparing means 3 compares the number of normal CPUs with the minimum number of CPUs stored in the minimum number storing means 2. In accordance with the result of the comparison by the comparing means 3, the initialization control means 4 initializes the system when the number of normal CPUs is greater than or equal to the minimum number of CPUs and thus it is judged that the system can be initialized, and suspends the initialization of the system when the number of normal CPUs is smaller than the minimum number of CPUs and thus it is judged that the system cannot be initialized.

Thus, even if fault has occurred in any of the CPUs, the system is automatically initialized to accomplish a task that is executable by the remaining CPUs.

The embodiment of the present invention will be now described in detail.

Figure 2:
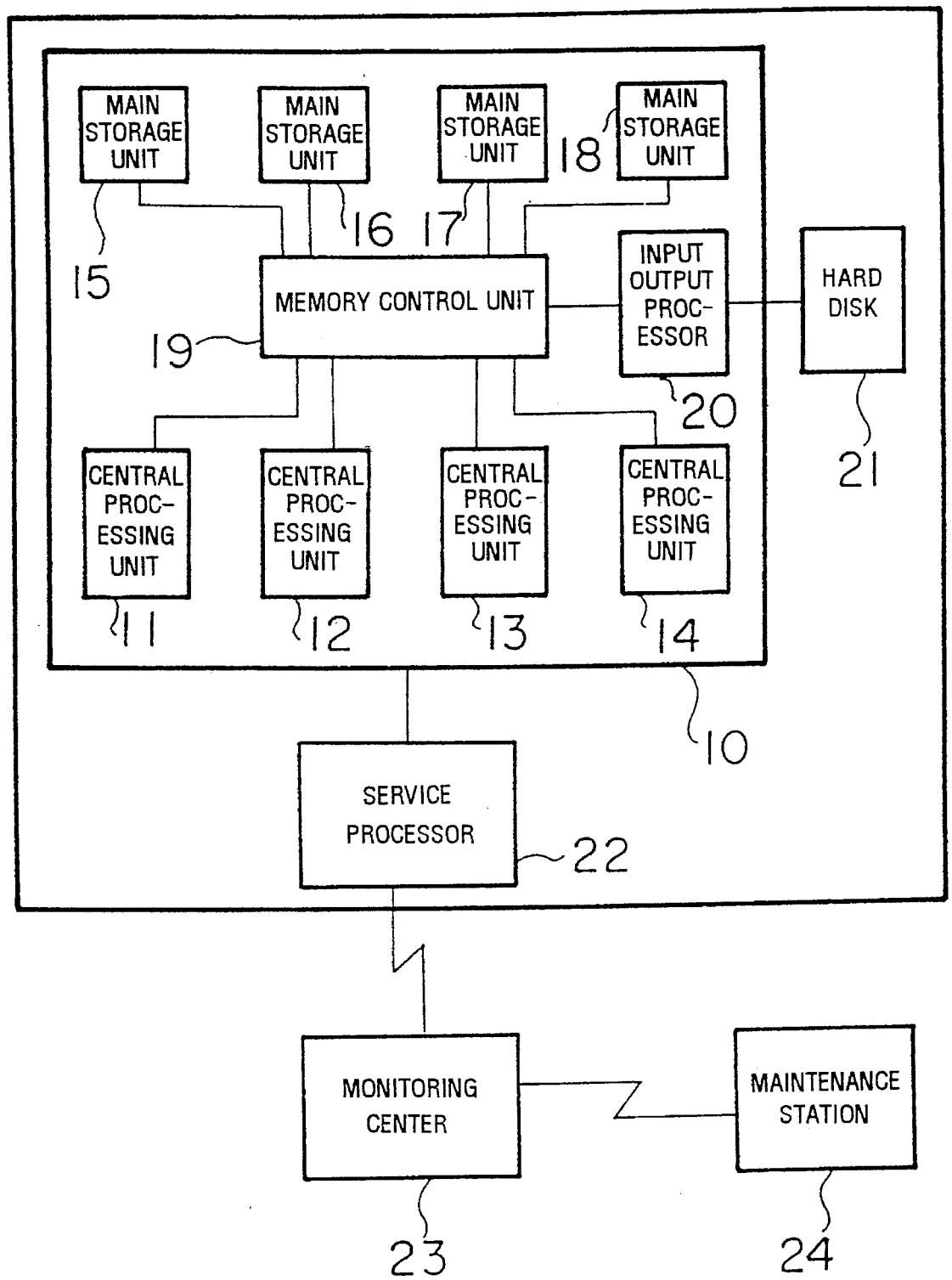
FIG. 2 is a block diagram schematically illustrating the configuration of a computer system equipped with a plurality of CPUs and having an automatic degradation/initialization function.

FIG. 2 is a block diagram schematically illustrating the configuration of a computer system equipped with a plurality of CPUs and having an automatic degradation/initialization function. Specifically, a processor 10 comprises four CPUs (Central Processing Units) 11 to 14, four MSUs (Main Storage Units) 15 to 18, an MCU (Memory Control Unit) 19 connected to the CPUs 11–14 and the MSUs 15–18, and an IOP (Input Output Processor) 20 connected to the MCU 19. An HD (Hard Disk) 21 as an external storage is connected to the IOP 20. The HD 21 stores an OS (Operating System) and a parameter library. The parameter library is a collection of preset data indicating minimum numbers of CPUs that are required for accomplishing respective tasks (applications programs) without hindrance.

The processor 10 is connected to an SVP (Service Processor) 22. The SVP 22 operates independently of the processor 10, and takes charge of console function, maintenance function, configuration control function, etc. The console function involves various operations performed by the operator, such as initialization and IPL, and the maintenance function involves detecting and recording faults, assisting in the recovery from faulty condition, specifying fault locations, and assisting in the external maintenance via a communication line. The configuration control function involves modification of the system configuration by the operator, automatic isolation of faulty devices, etc. Generally, the SVP 22 can also be used as a console for the OS.

The SVP 22 is connected to a monitoring center 23 and then to a maintenance station 24 via a communication line.

Figure 3:
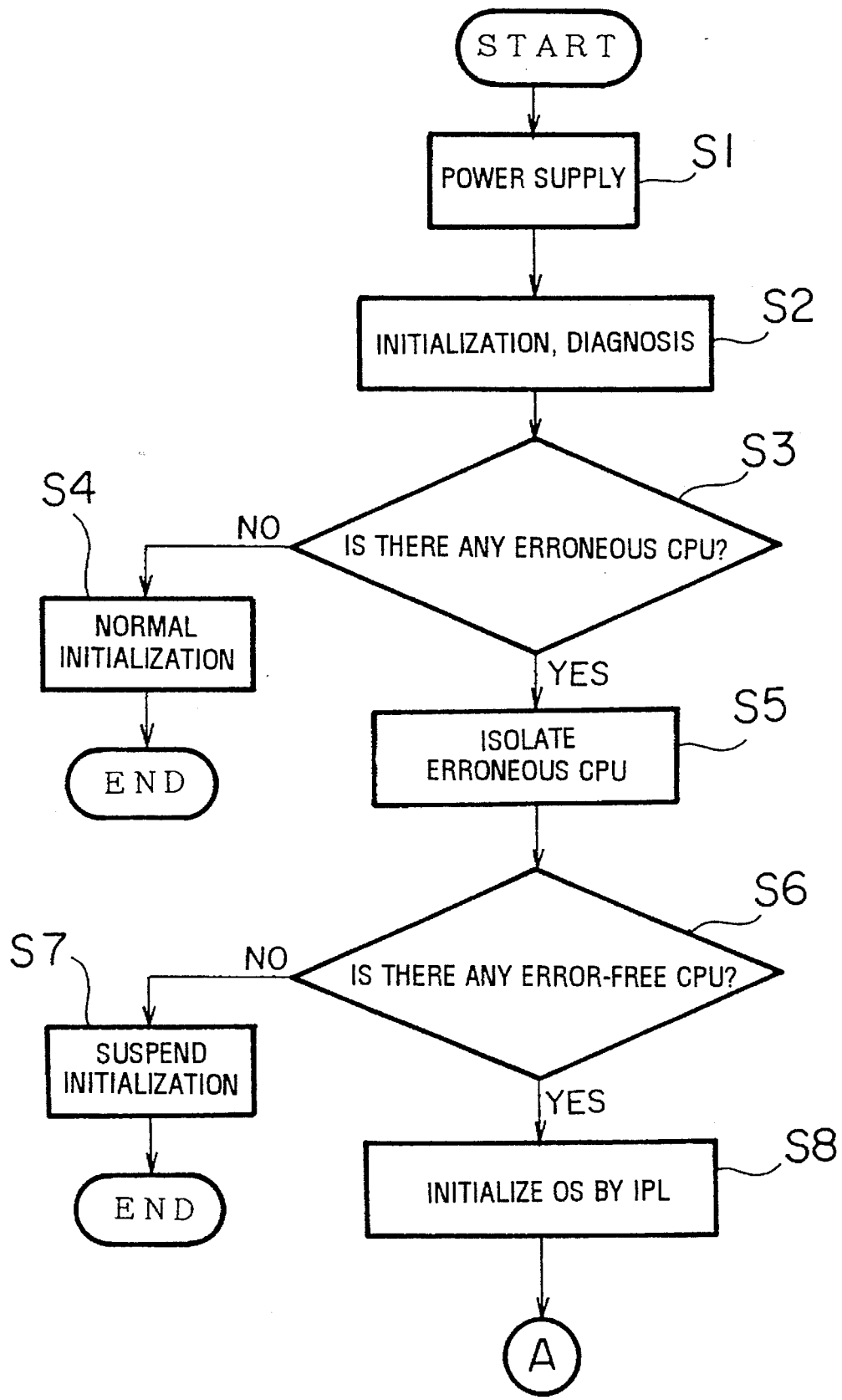
FIG. 3 is a flowchart showing the former half of an operation procedure executed when power is supplied to the computer system.
Figure 4:
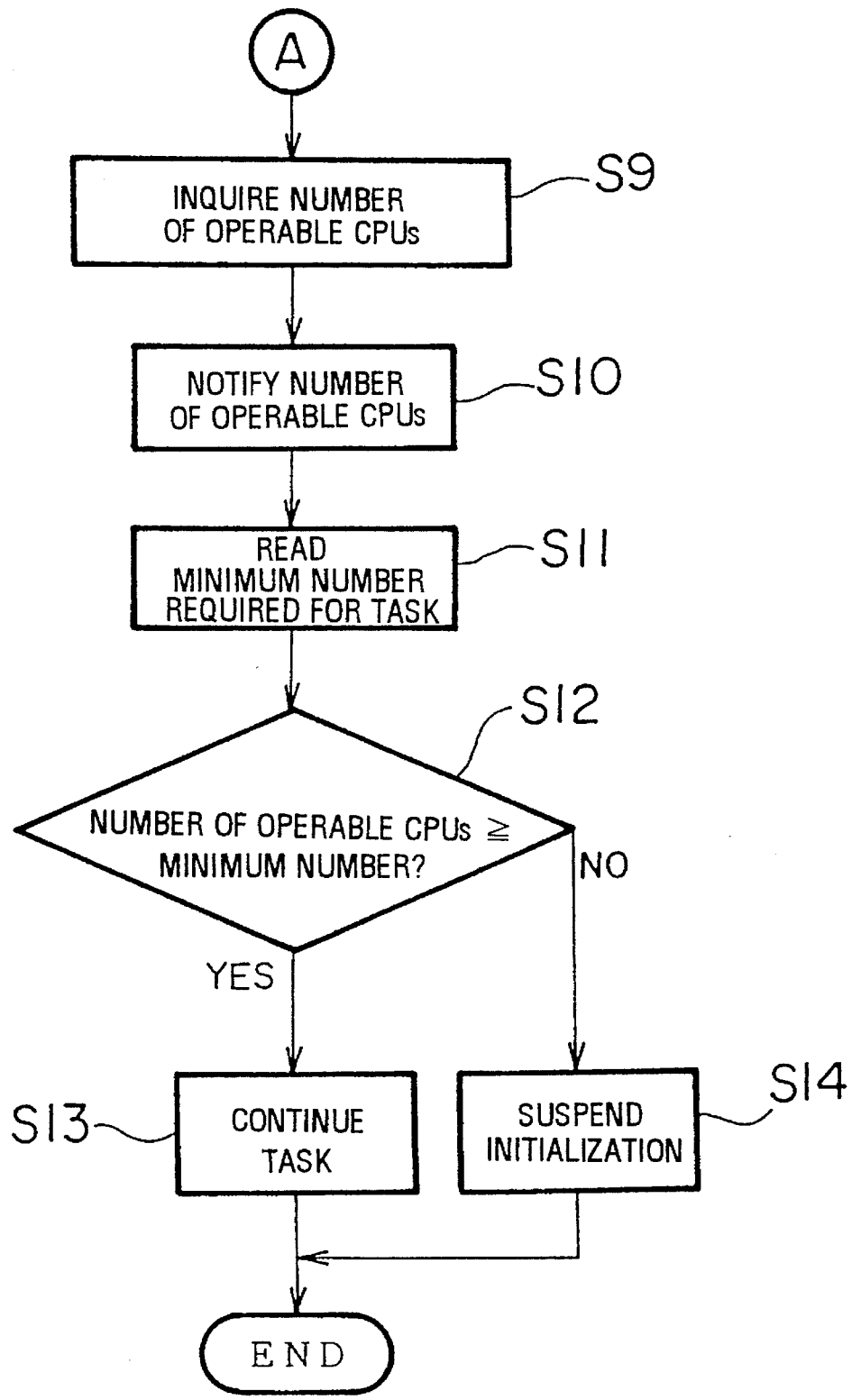
FIG. 4 is a flowchart showing the latter half of the operation procedure executed when power is supplied to the computer system.

Referring now to FIGS. 3 and 4, how the computer system configured as above operates when power is supplied thereto will be explained.

FIGS. 3 and 4 illustrate a flowchart of an operation procedure executed by the computer system when power is supplied thereto, wherein FIG. 3 shows the former half of the operation procedure, and FIG. 4 shows the latter half of the same. The procedure will be explained in order of steps.

[S1] Power is supplied to the individual devices.

[S2] The individual devices are initialized, and the SVP 22 performs an initial diagnosis on the devices of the processor 10.

[S3] If no erroneous CPU is detected as a result of the initial diagnosis performed on the CPUs 11 to 14, the flow proceeds to Step S4; if an erroneous CPU is detected, the flow proceeds to Step S5.

[S4] Since all CPUs are free of error, normal initialization is carried out under the control of the SVP 22.

[S5] The erroneous CPU is isolated by the SVP 22.

[S6] The SVP 22 determines whether there is a CPU(s) not isolated in Step S5 and thus remaining. Namely, a plurality of CPUs may become erroneous at the same time and isolated, and therefore, it is determined whether there is a normal CPU(s) remaining. If at least one CPU is normal, the flow proceeds to Step S8, and if there is no CPU remaining, the flow proceeds to Step S7.

[S7] Since there is no normal CPU, the SVP 22 suspends the initialization of the system, and automatically informs the monitoring center 23 that the system is down (not in operation). The maintenance station 24 is then automatically informed of non-operation of the system from the monitoring center 23, and recovers the system from faulty condition.

[S8] The OS can be initialized because at least one CPU is normal; therefore, the SVP 22 automatically performs IPL to initialize the OS. Specifically, the OS stored in the HD 21 is read via the IOP 20 and loaded into one of the MSUs 15 to 18.

[S9] The OS thus initialized issues a diagnosis command to the SVP 22, thereby inquiring the number of operable CPUs. Namely, an inquiry is made to the SVP 22 about the number of the remaining normal CPUs.

[S10] The SVP 22 informs the OS of the number of operable CPUs.

[S11] The OS reads a minimum number of CPUs required for accomplishing a predetermined task which is to be executed by the computer system, from the parameter library stored in the HD 21.

[S12] The OS compares the number of operable CPUs with the minimum number of CPUs required for executing the predetermined task. If the number of operable CPUs is greater than or equal to the minimum number, the OS judges that the predetermined task is executable using the remaining normal CPUs, and thus proceeds to Step S13. On the other hand, if the number of operable CPUs is smaller than the minimum number, the OS judges that the predetermined task cannot be accomplished by the remaining normal CPUs, and proceeds to Step S14.

[S13] Since the predetermined task can be executed by the remaining normal CPUs, the initialization of the system is continued.

[S14] Since the predetermined task cannot be accomplished by the remaining normal CPUs, the OS suspends the initialization of the system, and issues a diagnosis command to the SVP 22 to inform the same that the initialization of the system has failed. The SVP 22 immediately judges that the system has fallen into non-operation, and automatically notifies the monitoring center 23 that the system is in non-operation. The maintenance station 24 is automatically informed of non-operation of the system from the monitoring center 23, and recovers the system from faulty condition.

Thus, if fault occurs in any of the CPUs, degradation is performed depending upon the task to be executed, thereby permitting the task to be accomplished.

In the above embodiment, four CPUs are used, but the present invention is not limited in the number of CPUs to be used.

As described above, according to the present invention, the minimum number of CPUs required for accomplishing the predetermined task is stored in advance, the number of normal CPUs is compared with the minimum number of CPUs, and when the number of normal CPUs is greater than or equal to the minimum number, the system is initialized.

Accordingly, even if fault occurs in any of a plurality of CPUs, the system can be automatically initialized to accomplish a task that is executable by the remaining CPUs, whereby the system can be prevented from falling into non-operation, unlike the conventional system, and the availability ratio of the computer system is increased. Thus, the influence of fault upon the user can be minimized.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer system equipped with a plurality of CPUs and having an automatic degradation/initialization function, comprising:

CPU monitor and control means for monitoring the CPUs when power is supplied to the computer system, to determine whether fault has occurred in any of the CPUs, and for isolating a faulty CPU upon detection;

minimum number storing means for previously storing a minimum number of CPUs required for accomplishing a predetermined task;

comparing means for comparing a number of normal CPUs among said plurality of CPUs with the minimum number of CPUs stored in said minimum number storing means; and initialization control means, responsive to a result of the comparison by said comparing means, for initializing the computer system when the number of normal CPUs is greater than or equal to the minimum number of CPUs, and for suspending initialization of the computer system when the number of normal CPUs is smaller than the minimum number of CPUs.

2. A computer system according to claim 1, wherein said comparing means and said initialization control means are constituted by an operating system, the operating system being executed by using the normal CPUs.

3. A computer system according to claim 1, wherein said CPU monitor and control means is constituted by a service processor, said CPU monitor and control means judging that the computer system is in non-operation, when supplied with initialization suspend information from said initialization control means, and automatically notifying non-operation of the computer system to a person in charge of maintenance.

* * * * *